US008700085B2

(12) United States Patent
Johnsson et al.

(10) Patent No.: US 8,700,085 B2
(45) Date of Patent: Apr. 15, 2014

(54) DYNAMIC INTERFERENCE MITIGATION FOR CELLULAR NETWORKS

(75) Inventors: Kerstin Johnsson, Palo Alto, CA (US); Shilpa Talwar, Los Altos, CA (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 12/956,562

(22) Filed: Nov. 30, 2010

(65) Prior Publication Data

US 2012/0135763 A1 May 31, 2012

(51) Int. Cl.
 H04B 1/00 (2006.01)
 H04B 17/00 (2006.01)
 H04B 7/00 (2006.01)

(52) U.S. Cl.
 USPC .......... 455/522; 455/69; 455/67.13; 455/63.1

(58) Field of Classification Search
 USPC .................................. 455/1, 501, 63.1, 67.11
 See application file for complete search history.

(56) References Cited

U.S. PATENT DOCUMENTS

| 8,289,894 | B2 * | 10/2012 | Choudhury | 370/315 |
|---|---|---|---|---|
| 2009/0109939 | A1 * | 4/2009 | Bhushan et al. | 370/337 |
| 2009/0131065 | A1 * | 5/2009 | Khandekar et al. | 455/452.1 |
| 2009/0253449 | A1 * | 10/2009 | Gupta | 455/509 |
| 2009/0290550 | A1 * | 11/2009 | Bhattad et al. | 370/329 |
| 2010/0067427 | A1 | 3/2010 | Choudhury | |
| 2011/0003591 | A1 * | 1/2011 | Venkatachalam et al. | 455/434 |
| 2012/0088515 | A1 * | 4/2012 | Choi et al. | 455/450 |

FOREIGN PATENT DOCUMENTS

| WO | 2012/074819 A2 | 6/2012 |
|---|---|---|
| WO | 2012/074819 A3 | 8/2012 |

OTHER PUBLICATIONS

Ying, L "On Femtocell Interference Mitigation", IEEE 802.16 Broadband Wireless Access Working Group, IEEE 802 .16m-10/1367r2, Nov. 8, 2010, 3 pages.
International Search Report and Written Opinion Received for PCT Patent Application No. PCT/US2011/061724, Mailed on Jun. 22, 2012, 9 pages.
International preliminary report on patentability and Written Opinion received for PCT Patent Application No. PCT/US2011/061724, mailed on Jun. 13, 2013, 6 pages.

* cited by examiner

*Primary Examiner* — Tilahun B Gesesse
(74) *Attorney, Agent, or Firm* — Cool Patent, P.C.; Kenneth J. Cool

(57) ABSTRACT

A method for a wireless communication network is presented. In one embodiment, the method includes receiving, by a base station, information about one or more interfering base stations with respect to a communication channel used by a mobile station. The method includes sending silence requests to an interfering base station to reduce interference from that interfering base station with respect to the communication channel. The method further includes establishing communication with the mobile station via the communication channel.

17 Claims, 5 Drawing Sheets

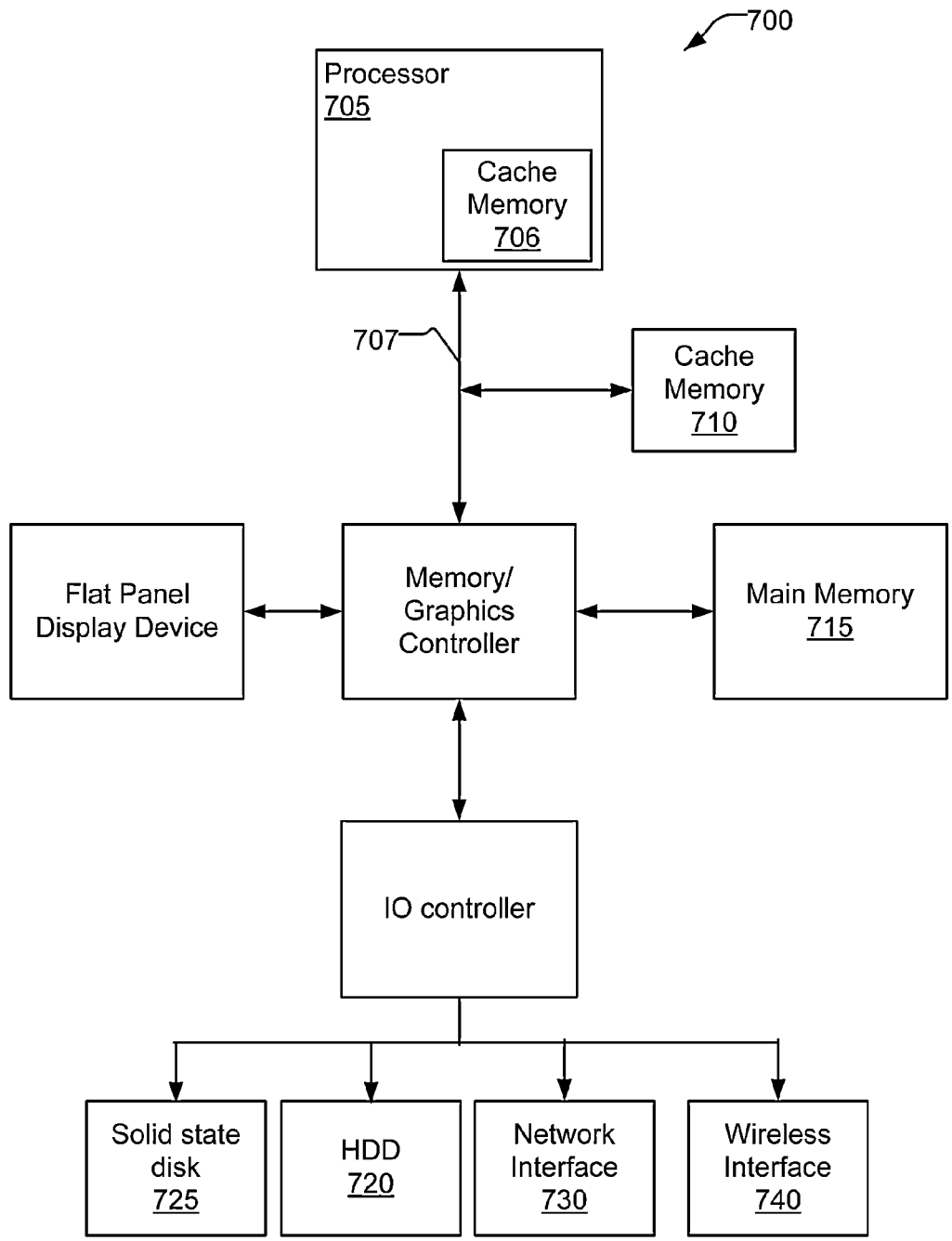

DYNAMIC INTERFERENCE MITIGATION FOR CELLULAR NETWORKS

FIELD OF THE INVENTION

Embodiments of the invention relate to data communication; more particularly, embodiments of the invention relates to interference mitigation.

BACKGROUND OF THE INVENTION

Multi-tier cellular networks provide significant coverage and capacity improvements over single-layer cellular networks. However, when the tiers of a cellular network are co-channel, they may introduce severe interference to each other.

Some networks place cellular tiers on different bands, which results in poor trunking efficiency and waste of bandwidth. Also, static partitioning of radio resources is wasteful since data traffic usually occurs in bursts. Other networks enforce very low base station density and power level limits to resolve the interference issue, but these measures fail to resolve the interference issue in any efficient manner. As a consequence, the overall throughput is reduced significantly.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 5 illustrates a computer system for use with one embodiment of the present invention.

DETAILED DESCRIPTION OF THE INVENTION

Figure 1:
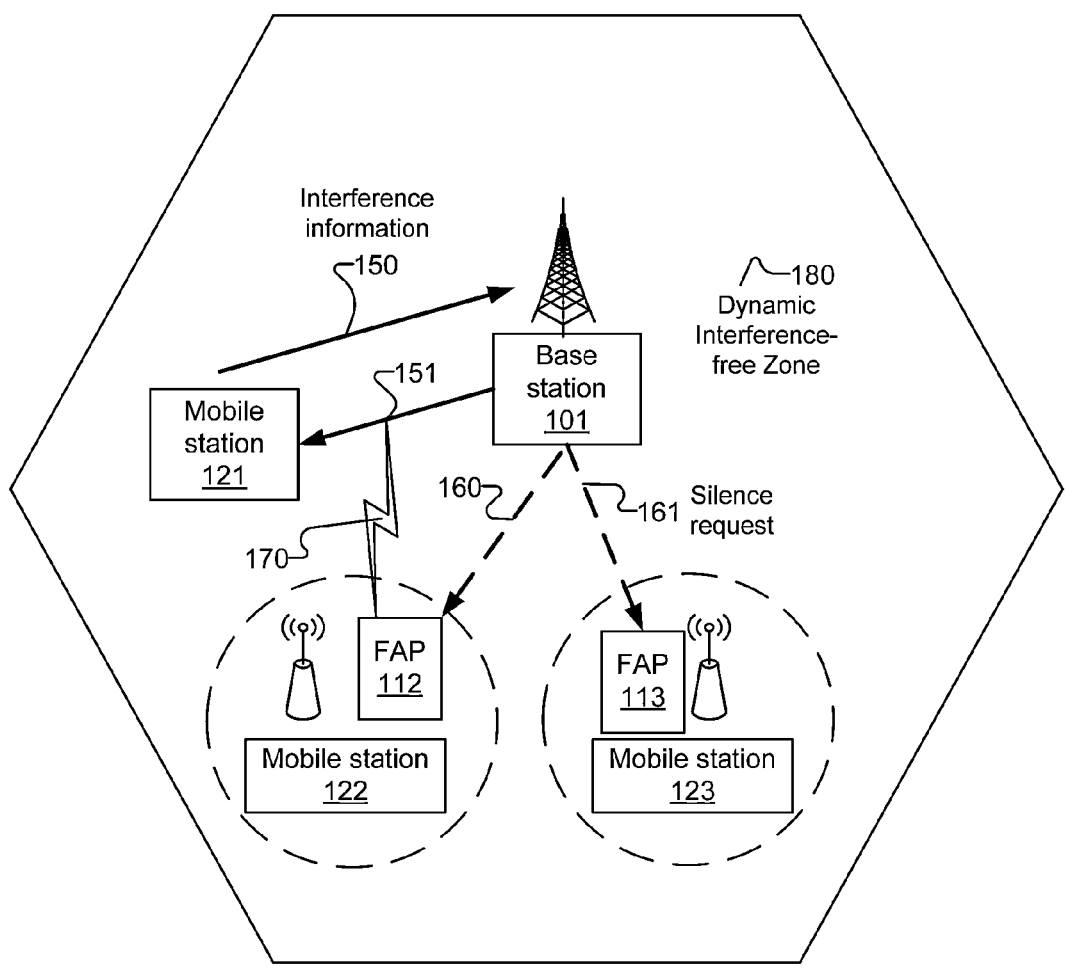
FIG. 1 is a block diagram showing dynamic interference mitigation in accordance with one embodiment of the invention.

A method for a wireless communication network is presented. In one embodiment, the method includes receiving, by a base station, information about one or more interfering base stations with respect to a communication channel used by a mobile station. The method includes sending silence requests to an interfering base station to reduce interference from that interfering base station with respect to the communication channel. The method further includes establishing communication with the mobile station via the communication channel.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

The methods and apparatus described herein are for interference mitigation with respect to co-channel multi-tier cellular networks. Specifically, the methods and apparatus are primarily discussed in reference to a computer system. However, the methods and apparatus are not so limited, as they may be implemented on or in association with any integrated circuit device or system, such as cell phones, personal digital assistants, embedded controllers, mobile platforms, desktop platforms, and server platforms, as well as in conjunction with other resources.

Overview

A method for a wireless communication network is presented. In one embodiment, the method includes receiving, by a base station, information about one or more interfering base stations with respect to a communication channel used by a mobile station. The method includes sending silence requests to an interfering base station to reduce interference from that interfering base station with respect to the communication channel. The method further includes establishing communication with the mobile station via the communication channel.

FIG. 1 is a block diagram showing dynamic interference mitigation in accordance with one embodiment of the invention. Many related components have not been shown to avoid obscuring the invention. Referring to FIG. 1, a communication system comprises base station 101, mobile stations 121-123, and femto-cell access points (FAP) 112-113.

In one embodiment, mobile station 121 receives data from base station 101 via channel 151. Mobile station 121 sends interference information 150 to base station 101. FAP 112 and FAP 113 are in close proximity to mobile station 121 such that channel 151 is affected by interference from FAP 112 and FAP 113. In one embodiment, base station 101 is capable of sending silence request 160 to FAP 112 and silence request 161 to FAP 113.

In one embodiment, the aforementioned units are shown as discrete components. Other embodiments are possible where some or all of these units are integrated within a device or within other components. In other embodiments, the aforementioned units are distributed throughout a system in hardware, software, or some combination thereof.

In one embodiment, FAP 112 interferes with mobile station 121 which is being served by base station 101 (e.g., a macro-cell base station). For instance, 6-15 dB loss in SINR (signal to interference noise ratio) occurs if FP 112 transmits at 10 dB transmit power.

Dynamic Interference-Free Zone

In one embodiment, dynamic interference-free zone 180 is a time/frequency zone in which interference is substantially lower as a result of the interference mitigation described herein. In one embodiment, dynamic interference-free zone 180 provides a low interference communication channel to macro-cell users while accommodating sufficient femto-cell transmission opportunities.

In one embodiment, a network user (e.g., mobile station 121) sends a report to a serving base station (e.g., base station 101). The report includes identities and interference levels of all base stations with significant received signal power at the network user (e.g., FAP 112 and FAP 113). In one embodiment, interfering base stations (or the interferers) are associated with particular interfering cell tiers. For instance, a macro-cell user reports about femto-cell access points which cause interference at power levels higher than a predefined threshold. In one embodiment, the threshold is determined in conjunction with a wireless profile, an operating system, a user configuration setting, or combinations thereof.

In one embodiment, base station 101 receives and stores interference statistics sent by its users. When scheduling a transmission to a specific user (e.g., mobile station 121), base station 101 requests the user's interfering base stations, for example, base stations (e.g., FAP 112) with received signal power at the user is greater than a predefined threshold, to remain silent for a period of time (e.g., a silence period).

In one embodiment, silence request 160 (quiescence request) is sent to FAP 112. Base station 101 requests the interfering base stations to listen for the downlink transmission schedule broadcast from base station 101. An interfering base station derives its transmission and silence schedule from, for example, A-MAP elements, downlink control information (DCI), or downlink resource block allocations.

Alternatively, in one embodiment, base station 101 creates a silence schedule based on its downlink transmission schedule. Base station 101 then multi-casts the silence schedule to interfering base stations. In one embodiment, the silence schedule is updated and is sent every scheduling period. In one embodiment, a silence request contains one or more silence periods. In one embodiment, a silence request contains information about the end time of a silence period, the number of repetitions of a silence period, or combination thereof.

In one embodiment, in response to a silence request, an interfering base station determines the time/frequency of silence periods. After determining the details about the silence periods, an interfering base station schedules transmissions (to the users) outside of these silence periods. In one embodiment, an interfering base station schedules its transmissions to avoid overlap between the transmission and the silence periods. In one embodiment, an interfering base station schedules its transmissions in order to reduce overlap between transmission and silence periods.

In one embodiment, an interfering base station, upon a request from another base station, dynamically adjusts its transmission periods and power levels based on the current interference situation.

In one embodiment, a femto-cell network is about 10 meters wide. In comparison to a macro-cell network which serves many more users, a femto-cell access point has an easier time accommodating silence periods without negatively affecting its users. A femto-cell access point is operable to determine, dynamically, whether to transmit based at least on silence requests.

In one embodiment, dynamic interference mitigation improves the number of available transmission opportunities for interfering base stations while protecting users (e.g., macro-cell users) from the outage that would otherwise result from the interference of these tiers of co-channel cells. A dynamic interference-free zone (DIZ) provides a dynamic way of preventing a particular cell tier from deteriorating the channel quality of another cell tier. The scheme is able to dynamically adapt to the changing traffic and interference environment. The scheme also allows different wireless cellular tiers to reside on the same band without limiting base station density and transmit power so low that it causes a significant drop in throughput.

For instance, in one embodiment, there are approximately 50 femto-cells per sector, 65 outdoor users per sector, and 1 to 4 indoor users per femto-cell. Outdoor users are attached to the macro base station with the strongest signal. Indoor users are attached to local femto-cells. The macro-cell and femto-cells reside on a same band (or overlapping bands). In one embodiment, interference mitigation is necessary to protect outdoor users from outage. A dynamic interference-free zone (e.g., femto-cell silence zone) provides low macro-cell user outage without significantly reducing indoor throughput as femto-cell access points dynamically schedule transmission around the macro-cell transmission schedule.

In one embodiment, mobile station 121 comprises sampling logic to collect interference data with respect to a communication channel, control logic to determine interfering base stations which interfere with communication channel 151, and reporting logic to send interference information to base station 101 to mitigate interference if the interference level is higher than a threshold level. The control logic determines whether an interference level associated with an interfering base station is higher than a threshold value.

In one embodiment, base station 101 is a transmitter in a downstream or downlink case. A transmitter may be interchangeably referred to as an advance base station, a base station (BS), an enhanced Node B (eNB), or an access point (AP) at the system level herein. In this downlink case, mobile station 121 is a receiver. A receiver may be interchangeably referred to as an advanced mobile station (AMS), a mobile station (MS), a subscriber station (SS), a user equipment (UE), or a station (STA) at the system level herein. Further, the terms ABS, BS, eNB, and AP may be conceptually interchanged, depending on which wireless protocol is being used, so a reference to BS herein may also be seen as a reference to either of ABS, eNB, or AP. Similarly, a reference to MS herein may also be seen as a reference to either of AMS, SS, UE, or STA.

Figure 2:
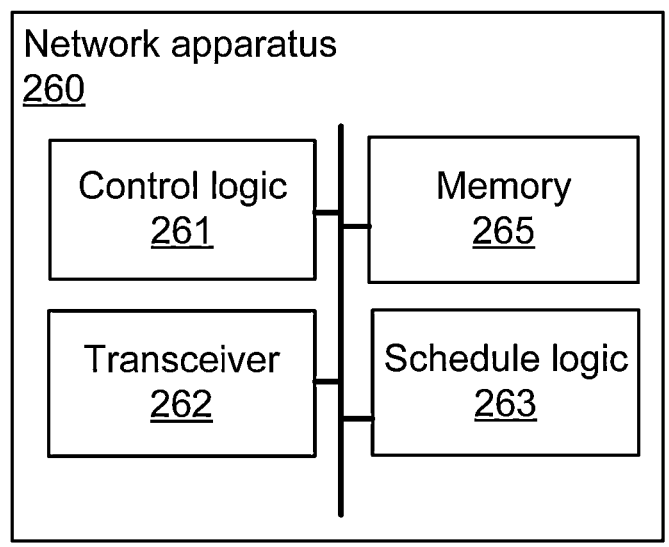
FIG. 2 shows a block diagram of a network apparatus in accordance with one embodiment of the invention.

FIG. 2 shows a block diagram of a network apparatus in accordance with one embodiment of the invention. Many related components such as data buses and peripherals have not been shown to avoid obscuring the invention. Referring to FIG. 2, in one embodiment, network apparatus 260 comprises control logic 261, transceiver 262, memory 265, and schedule logic 263. In one embodiment, the network apparatus is a serving base station of a macro-cell tier.

In one embodiment, schedule logic 263 generates a transmission schedule for communication with a particular user equipment (UE) (or a particular mobile station).

In one embodiment, control logic 261 receives interference information about one or more enhanced nodes B (eNBs) which interfere with a communication channel between network apparatus 260 and the UE. Control logic 261 sends a request to an interfering eNB so that the eNB dynamically avoids interfering (e.g., by stalling transmission) with the communication channel based at least in part on the transmission schedule.

In one embodiment, control logic 261 controls operations of network apparatus 260. In one embodiment, memory 265 stores programs to be executed by control logic 261.

In one embodiment, transceiver 262 includes physical (PHY) layer circuitry for communicating with the physical mediums (wireless or otherwise), media access control (MAC) layer circuitry, and higher-level layer (HLL) circuitry. In one embodiment, PHY layer circuitry, MAC layer circuitry, and HLL circuitry comprise functionality for both receiver and transmitter operations and include processing circuitry to evaluate communications from network apparatus 260, among other things. In one embodiment, transceiver 262 is connected to a core network, such as an Internet protocol (IP) network, via a wireless connection, a physical wired connection (e.g., electrical or fiber optic connection), or both.

In one embodiment, network apparatus 260 comprises, for example, client devices and network points of attachments. In one embodiment, network apparatus 260 is fixed, stationary, or mobile depending on the particular environment or implementation and communicates over the medium of free space generally referred to as the "air interface" (e.g., wireless shared media).

In one embodiment, network apparatus 260 comprises wireless devices that comply with or operate in accordance with one or more protocols, such as, for example, WiFi, Bluetooth, UWB, WiMAX, and other cellular protocols. Network apparatus 260 comprises, but is not necessarily limited to, a computer, server, workstation, laptop, ultra-laptop, handheld computer, telephone, cellular telephone, personal digital assistant (PDA), router, switch, bridge, hub, gateway, wireless device, multi-network, multiple integrated radio devices, mixed-network device supporting multiple concurrent radios, WiFi plus cellular telephone, portable digital music player, pager, two-way pager, mobile subscriber station, printer, camera, enhanced video and voice device, and any other one-way or two-way device capable of communicating with other devices or base stations. The embodiments are not limited in this context.

Figure 3:
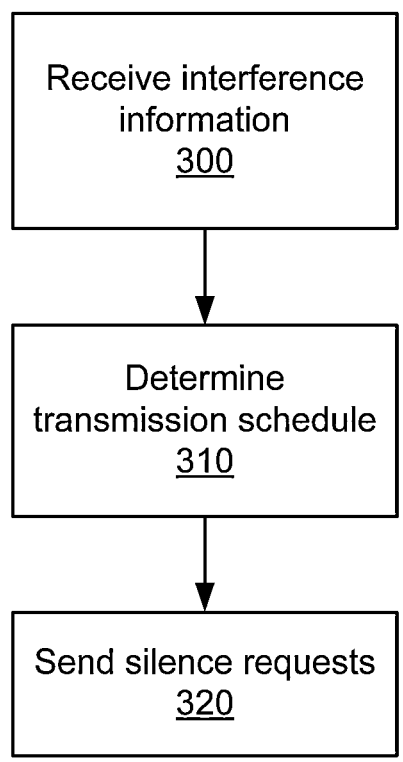
FIG. 3 is a flow diagram of one embodiment of a process to perform dynamic interference mitigation.

FIG. 3 is a flow diagram of one embodiment of a process to perform dynamic interference mitigation. The process is performed by processing logic that may comprise hardware (circuitry, dedicated logic, etc.), software (such as one that is run on a general purpose computer system or a dedicated machine), or a combination of both. In one embodiment, the process is performed in conjunction with a network apparatus (e.g., network apparatus 260 with respect to FIG. 2). In one embodiment, the process is performed by a computer system such as the computer system shown in FIG. 5.

Referring to FIG. 3, in one embodiment, processing logic begins by receiving interference information (process block 300). The interference information is received from a mobile station. The interference information includes identities about one or more interfering base stations causing interference in a communication channel used by the mobile station. In one embodiment, an interfering base station is of a particular cell tier and has caused interference higher than a threshold interference level.

In one embodiment, processing logic determines a transmission schedule for the communication with the mobile station (process block 310). Processing logic generates a silence schedule based on a downlink transmission schedule.

In one embodiment, processing logic sends a silence request to an interfering base station by specifying a dynamic interference-free zone (process block 320). A silence request includes the silence schedule. In one embodiment, processing logic sends silence requests to one or more interfering base stations to reduce interference.

In one embodiment, processing logic establishes communication with the mobile station via the communication channel.

Figure 4:
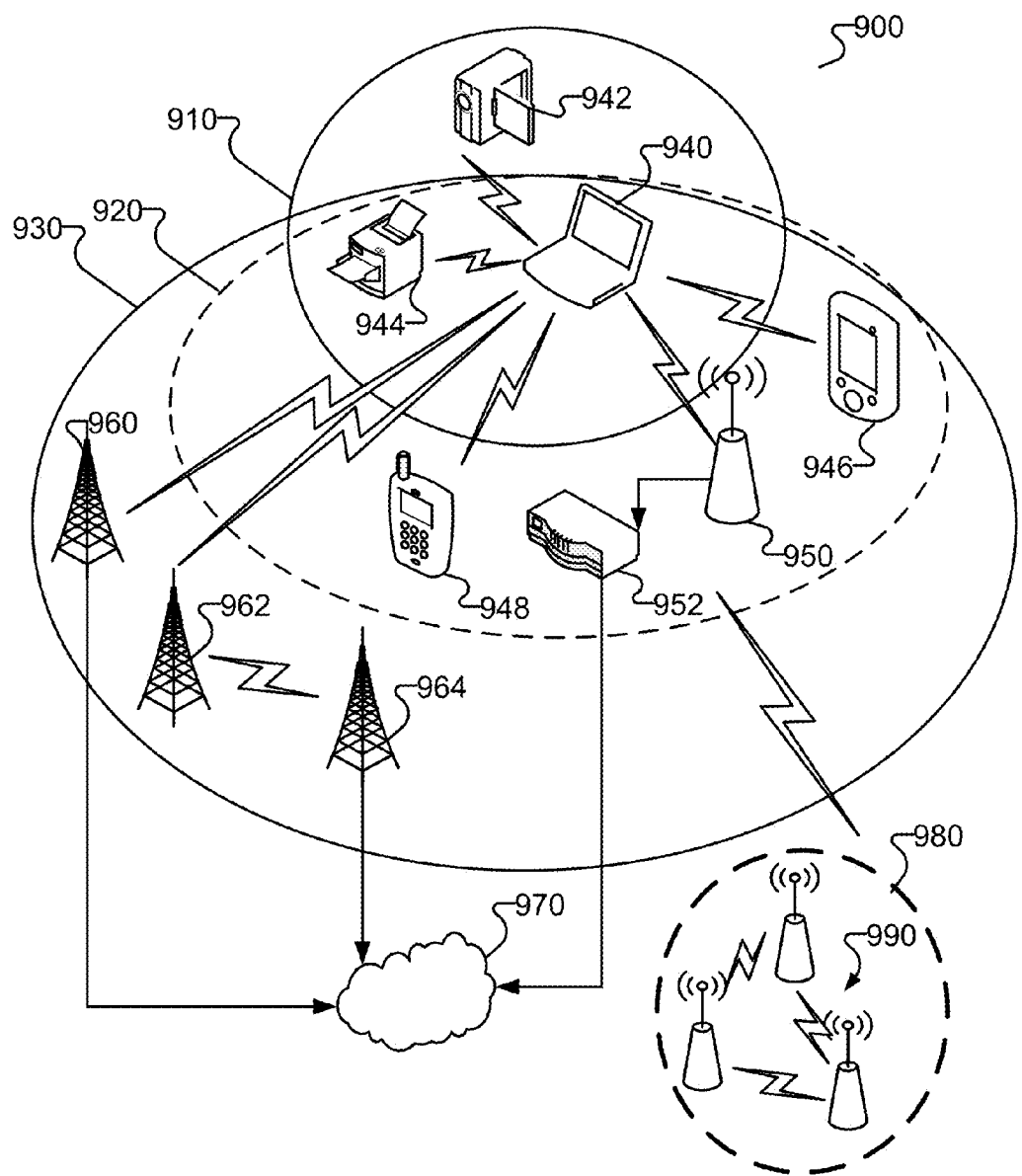
FIG. 4 is a diagram representation of a wireless communication system in accordance with one embodiment of the invention.

FIG. 4 is a diagram representation of a wireless communication system in accordance with one embodiment of the invention. Referring to FIG. 4, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct sequence spread spectrum (DSSS) modulation, frequency hopping spread spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WPAN, a WLAN, and a WMAN, in one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

FIG. 5 illustrates an example of a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for a wireless communication network comprising:
   receiving, by a first base station, information about one or more interfering base stations with respect to a communication channel used by a mobile station;
   determining a downlink transmission schedule for the communication with the mobile station;
   requesting an interfering base station to listen for the downlink transmission schedule broadcast from the first base station;
   requesting the interfering base station to reduce transmission power or to avoid transmitting when the first base station is ready to use the communication channel and to dynamically allow the interfering base station to transmit when the first base station is not using the communication channel;
   broadcasting the downlink transmission schedule from the first base station; and
   establishing communication with the mobile station via the communication channel.

2. The method of claim 1, further comprising receiving the interference information from the mobile station.

3. The method of claim 1, wherein the information includes interference statistics about one or more base stations which interfere with the communication channel between the first base station and the mobile station.

4. The method of claim 1, wherein the information includes an interfering base station with an interference level which is more than a threshold value.

5. The method of claim 1, further comprising:
   generating a silence schedule based on a downlink transmission schedule; and
   sending the silence schedule to an interfering base station.

6. The method of claim 1, wherein the first bases station is a higher-tier base station or an enhanced node B (eNB), wherein the first base station is a preferred radio access technology than the one or more interfering base stations.

7. The method of claim 1, wherein an interfering base station is able to use the communication channel if the first base station is not transmitting data to the mobile station.

8. A method for a wireless communication network comprising:
   detecting interference caused by one or more base stations which interfere with a communication channel for use to communicate with a serving base station;
   generating interference information, wherein the interference information includes interference statistics caused by an interfering base station; and
   sending the interference information to the serving base station, wherein the serving base stations requests the interfering base station to reduce transmission power or to avoid transmitting when another base station is ready to use the communication channel and to dynamically allow the interfering base station to transmit when the first base station is not using the communication channel.

9. The method of claim 8, wherein the interference information includes data to identify an interfering base station.

10. The method of claim 8, wherein the interference information includes an identity of a base station if the interference level associated with the base station is more than a first value.

11. A method for a wireless communication network comprising:
 receiving a quiescence request from a first base station; and
 preventing, in response to the quiescence request, transmission which affects an interference level of a communication channel between the first base station with a mobile station;
 wherein the quiescence request includes a command to listen for a transmission schedule broadcast from the first base station, further comprising determining a transmission schedule from A-MAP (advanced media access protocol) elements, and
 wherein the quiescence request includes a command to reduce transmission power or to avoid transmitting when the first base station is ready to use the communication channel and to dynamically transmit when the first base station is not using the communication channel.

12. The method of claim 11, wherein the quiescence request includes a quiescence schedule generated based on a downlink transmission schedule associated with the first base station, further comprising dynamically determining when to begin transmitting again based on the quiescence schedule.

13. The method of claim 11, further comprising communicating with the first base station to acknowledge the quiescence request.

14. A system for a radio access technology comprising:
 transmission schedule logic to generate a transmission schedule for communication with user equipment (UE);
 control logic to receive interference information about one or more enhanced nodes B (eNBs) which interfere with a communication channel between the system and the UE, wherein the control logic is operable to send a request to an eNB so that the eNB dynamically avoids interfering with the communication channel based at least in part on the transmission schedule, wherein the request includes a command to the eNB to listen for a transmission schedule broadcast; and
 control logic to request to an interfering eNB to reduce transmission power or to avoid transmitting when another eNB is ready to use the communication channel and to dynamically allow the interfering eNB to transmit when the other eNB is not using the communication channel.

15. The system of claim 14, wherein the request includes data about the transmission schedule.

16. An apparatus for a wireless communication network comprising:
 sampling logic to collect interference data with respect to a communication channel to a first base station;
 control logic to determine one or more interfering base stations which interfere with the communication channel, wherein the control logic is operable to determine whether an interference level associated with an interfering base station is more than a threshold value;
 reporting logic to send interference information to the first base station to mitigate interference if the interference level is more than a threshold level, wherein the interference information includes interference statistics caused by an interfering base station; and
 control logic to request the interfering base station to reduce transmission power or to avoid transmitting when the first base station is ready to use the communication channel and to dynamically allow the interfering base station to transmit when the first base station is not using the communication channel.

17. The apparatus of claim 16, wherein the interference information includes an identity of the interfering base station.

* * * * *